(12) United States Patent
Feng et al.

(10) Patent No.: US 12,231,026 B2
(45) Date of Patent: Feb. 18, 2025

(54) STATOR FOR A ROTATING ELECTRICAL MACHINE

(71) Applicant: Cummins Generator Technologies Limited, Peterborough (GB)

(72) Inventors: Zhanhui Feng, Peterborough (GB); Qiang Wu, Peterborough (GB); Xiaoyan Shen, Peterborough (GB)

(73) Assignee: CUMMINS GENERATOR TECHNOLOGIES LTD, Peterborough (GB)

( * ) Notice: Subject to any disclaimer, the term of this patent is extended or adjusted under 35 U.S.C. 154(b) by 250 days.

(21) Appl. No.: 17/774,022

(22) PCT Filed: Nov. 4, 2020

(86) PCT No.: PCT/GB2020/052790
§ 371 (c)(1),
(2) Date: May 3, 2022

(87) PCT Pub. No.: WO2021/090001
PCT Pub. Date: May 14, 2021

(65) Prior Publication Data
US 2023/0028465 A1 Jan. 26, 2023

(30) Foreign Application Priority Data
Nov. 5, 2019 (GB) ..................................... 1916070

(51) Int. Cl.
*H02K 1/20* (2006.01)
*H02K 9/16* (2006.01)
*H02K 9/22* (2006.01)

(52) U.S. Cl.
CPC ................................... *H02K 9/227* (2021.01)

(58) Field of Classification Search
CPC ............. H02K 1/20; H02K 9/227; H02K 9/16
See application file for complete search history.

(56) References Cited

U.S. PATENT DOCUMENTS

| | | | | | |
|---|---|---|---|---|---|
| 1,882,487 | A | * | 10/1932 | Dupont | H02K 9/06 310/216.011 |
| 2,818,515 | A | * | 12/1957 | Dolenc | H02K 1/185 310/216.049 |

(Continued)

FOREIGN PATENT DOCUMENTS

| | | |
|---|---|---|
| JP | 2013-162608 A | 8/2013 |
| WO | WO 2005/022718 | 3/2005 |

OTHER PUBLICATIONS

International Search Report and Written Opinion for International Application No. PCT/GB2020/052790, dated Feb. 1, 2021 (13 pages).

(Continued)

*Primary Examiner* — Burton S Mullins
(74) *Attorney, Agent, or Firm* — Foley & Lardner LLP

(57) ABSTRACT

A stator for a rotating electrical machine is disclosed, the stator comprising a stack of stator laminations (20) forming a stator core (48; 60; 74; 80; 82). A lamination (20) comprises a plurality of cooling fins (28) arranged in at least one group of at least two fins. The cooling fins in a group are connected by a peripheral connecting member (30). The laminations are arranged in packs of at least one lamination. A group of fins (28) in one pack of laminations lies circumferentially between two adjacent groups of fins in an adjacent pack of laminations. A cooling fin (28) in one pack of laminations is interposed between two cooling fins in a group of cooling fins in another non-adjacent pack of laminations. This can allow a good thermal performance to be achieved while at the same time providing good mechanical strength and being cost effective to manufacture.

18 Claims, 15 Drawing Sheets

(56) References Cited

U.S. PATENT DOCUMENTS

| | | | |
|---|---|---|---|
| 4,912,350 A | 3/1990 | Parshall et al. | |
| 6,707,222 B2* | 3/2004 | Hsu | H02K 11/33 310/254.1 |
| 8,427,018 B2* | 4/2013 | Dutau | H02K 1/20 310/58 |
| 10,355,542 B2* | 7/2019 | McClelland | H02K 1/185 |
| 2010/0207465 A1 | 8/2010 | Dutau et al. | |
| 2016/0380490 A1 | 12/2016 | McClelland et al. | |

OTHER PUBLICATIONS

Search Report for GB1916070.4, dated Apr. 16, 2020 (3 pages).

* cited by examiner

STATOR FOR A ROTATING ELECTRICAL MACHINE

CROSS-REFERENCE TO RELATED APPLICATION

This application is a U.S. national stage entry of PCT/GB2020/052790 filed Nov. 4, 2020, which claims priority to UK Patent Application No. 1916070.4 filed Nov. 5, 2019, the entire contents of which are incorporated herein by reference.

The present invention relates to a stator for a rotating electrical machine, and in particular a stator with cooling fins for cooling of the stator.

Rotating electrical machines, such as motors and generators, generally comprise a rotor and a stator, with the rotor mounted on a shaft and arranged to rotate inside the stator. The rotor produces a rotating magnetic field which crosses an airgap between the rotor and the stator. The stator comprises a stator core which holds stator windings which combine with the rotating magnetic field. The stator itself may be held within a stator frame, with an airgap between the two.

When the machine is in operation, currents passing through the stator and/or rotor windings, as well as other factors such as friction and windage losses, may cause the machine to heat up. Therefore many machines, particularly those of a larger design, require some form of cooling. This may be achieved by providing a fan for forcing air flow through the machine. Air flow through the machine is usually in a generally axial direction. The main paths for the air flow are through the rotor/stator airgap, and through the airgap between the stator core and the stator frame.

It is known to provide a stator core with cooling fins. The cooling fins typically extend radially outwards from the stator core into the airgap between the stator core and the stator frame in order to increase the transfer of heat from the stator core to the cooling air.

The stator of a rotating electrical machine is normally formed from a stack of laminations. The laminations are usually punched from a roll or sheet of electrical steel. When the laminations are produced, a certain amount of the raw material may be left behind and discarded as scrap. However, it would be desirable to reduce the amount of scrap in order to reduce the cost of production.

WO 2005/022718 A1, the subject matter of which is incorporated herein by reference, discloses a laminated stator with cooling fins, in which staggered rows of cooling fins are formed on the outside of the stator. Staggering the cooling fins can improve the heat transfer from the stator to the cooling air passing over the stator.

US 210/02077465, the subject matter of which is incorporated herein by reference, discloses a stator for a rotating electrical machine, the stator comprising a stack of laminations, subassemblies of the laminations having extensions. Each extension comprises a plurality of fins connected at their outer ends by peripheral connections.

While the known cooling fin arrangements can provide some improvements in the cooling of the stator, it has been found that various problems may remain. In particular, the known arrangements may be complex to manufacture, inefficient in terms of material usage and/or lack mechanical stability. Previous attempts to address these issues have tended to compromise the cooling efficiency. It would therefore be desirable to provide a cooling fin arrangement which can allow a good thermal performance to be achieved while at the same time providing good mechanical strength and being cost effective to manufacture.

According to one aspect of the present invention there is provided a stator for a rotating electrical machine, the stator comprising a stack of stator laminations forming a stator core, wherein:
  a lamination comprises a plurality of cooling fins arranged in at least one group of at least two fins;
  the cooling fins in a group are connected by a peripheral connecting member;
  the laminations are arranged in packs of at least one lamination;
  a group of fins in one pack of laminations lies circumferentially between two adjacent groups of fins in an adjacent pack of laminations; and
  a cooling fin in one pack of laminations is interposed between two cooling fins in a group of cooling fins in another (non-adjacent) pack of laminations.

The present invention may provide the advantage that, by providing a lamination with a group of cooling fins connected by a peripheral connecting member, and interposing a cooling fin in one lamination between two cooling fins in a group of cooling fins in another lamination, a staggered cooling fin arrangement may be achieved which may provide good heat transfer from the stator to the cooling fluid while at the same time providing good mechanical stability. Furthermore, the present invention may provide improvements in material usage and/or ease of manufacture.

By "interposed" it is preferably meant that, when viewed axially, the cooling fin in one pack of laminations is located between the two cooling fins in another pack of laminations. Thus a cooling fin in one pack of laminations is preferably interposed circumferentially between two cooling fins in a group of cooling fins in another pack of laminations (for example, a pack of laminations on the other side of the adjacent pack of laminations).

Preferably the cooling fins extend in a generally radial direction, and the peripheral cooling members extend in a generally circumferential direction (although of course some deviation from the radial and circumferential directions is possible). For example, the laminations may comprise an annular body with an outer edge, and the cooling fins may extend radially outwards from the outer edge. This may allow the cooling fins to extend into an airgap between the stator and a stator frame in the assembled machine. Preferably stator slots for accommodating stator windings are provided on the radially inwards side of the annular body.

Preferably gaps for cooling fluid are provided between adjacent cooling fins of a group. The gaps are preferably radially beneath the peripheral connecting member. Thus, the peripheral connecting member may bridge a gap between two adjacent cooling fins in a group. This can facilitate the passage of cooling fluid through the assembled machine.

Preferably the peripheral connecting member connects radially outwards ends of the fins in a group. This may help to ensure that the cooling fins have sufficient mechanical strength, while allowing gaps for cooling fluid to be provided between adjacent cooling fins of a group.

In some circumstances a pack of laminations may comprise a single lamination. In this case, successive laminations may be indexed (rotated about their axis) with respect to each other. However, since the laminations may be relatively thin, this may result in cooling fins which could be easily deformed. Thus, a pack of laminations may comprise a plurality of laminations (for example, 2, 3, 4, 5, 6, 7, 8 or more laminations) adjacent to each other in an axial direction. The laminations in a pack may be rotationally aligned. However, packs of laminations may be indexed with respect to each other. Thus, in the assembled stator, a cooling fin may have a thickness in an axial direction which is equivalent to the total thickness of the laminations in a pack. This may help to ensure that the cooling fins have the necessary mechanical strength. All of the packs may have the same number of laminations, or different packs may have different numbers of laminations, as appropriate.

Preferably a cooling fin in one pack of laminations is interposed between two cooling fins in a group of cooling fins in a pack of laminations which lies on the other side of the adjacent pack of laminations (i.e. adjacent to the adjacent pack of laminations). This may help to ensure that air gaps are provided between cooling fins in an axial direction, which may assist with cooling.

Preferably the cooling fins of one pack of laminations are staggered with respect to the cooling fins of another pack of laminations. As a consequence, cooling fluid passing axially between two cooling fins in a group of cooling fins in one pack of laminations may encounter a cooling fin in another pack of laminations. This may increase the amount of cooling fluid passing around the cooling fins and/or help to introduce turbulence, both of which may help with the transfer of heat from the stator to the cooling fluid.

Preferably the stator comprises a plurality of laminations with at least one group of cooling fins. Thus, some or all of the laminations may comprise at least one group of cooling fins. This may help to ensure that sufficient cooling fins are provided for effective cooling.

Preferably at least some of the laminations comprise a plurality of groups of cooling fins (for example, two, three, four, five, six or more groups of cooling fins). Thus the stator may comprise a plurality of laminations each having a plurality of groups of cooling fins, each group comprising a plurality of cooling fins connected by a peripheral connecting member. This may help to ensure that a sufficient number of cooling fins are provided, while helping to ensure structural integrity.

In some embodiments, at least one group of fins may have a different number of fins from another group of fins in the same lamination. For example, the number of fins in one group may be one higher than the number of fins in another group in the same lamination. This may help to achieve a staggered arrangement of cooling fins in the assembled stator, for example through appropriate indexing of the laminations.

A group of fins with a lower number of fins in one lamination may have all of its fins interposed between the fins in a group of fins with a higher number of fins in another lamination. Furthermore, a group of fins with a higher number of fins in one lamination may have centre fins which are interposed between the fins in a group of fins with a lower number of fins in another lamination. This may help to optimise contact between the cooling fins and the cooling fluid during operation of the machine.

In other embodiments, a lamination may have a plurality of groups of fins each of which has the same number of fins. In this case, the staggered nature of the cooling fins may be achieved through appropriate indexing of the packs of laminations. For example, successive packs of laminations may be indexed such that a group of fins in one pack of laminations lies circumferentially between two adjacent groups of fins in an adjacent pack of laminations, but closer circumferentially to one group than the other group. This may be achieved by indexing successive packs of laminations by an amount which is slightly different from (slightly greater than or slightly less than) a value which is equivalent to half of the angular distance between two adjacent groups of fins (or an odd multiple thereof) in a pack. For example, successive packs of laminations may be indexed by a value which is equivalent to half of the angular distance between two adjacent groups of fins (or an odd multiple thereof) plus or minus a value sufficient to ensure alignment of the stator slots (for example, a value greater than zero and less than or equal to a stator slot pitch or a multiple thereof). Thus, when viewed in an axial direction through the stator core, the groups of fins in alternate packs of laminations may be skewed, that is, a line running through their centre may be offset (at a non-zero angle) to the axial direction. This arrangement may help to ensure that there are no (or limited) straight-line (line-of-sight) paths for air flow through the entire stator core in an axial direction. This may help to introduce more turbulence than would otherwise be the case, which may help to increase the amount of cooling.

The groups of cooling fins within a lamination are preferably arranged such that a distance between two adjacent groups in a circumferential direction is greater than a width of a group in a circumferential direction. This may allow the laminations to be indexed such that a group of fins in one pack of laminations lies circumferentially between two adjacent groups of fins in another pack of laminations. This may help to create gaps between cooling fins in an axial direction through the machine. This in turn may help to optimise the amount of cooling fluid which contacts the cooling fins during operation of the machine.

Preferably the groups of cooling fins within a lamination are equally spaced in a circumferential direction. This may help to ensure efficient usage of material and optimum spacing of the cooling fins in the assembled stator core.

Preferably the groups of cooling fins within a lamination are arranged such that they extend into corners of a notional rectangle encompassing the lamination. Since the laminations are usually stamped from a sheet of material having parallel sides, this may allow the cooling fins to be formed from an area of the raw material which would otherwise be discarded as scrap.

In the case where the laminations comprise an annular body, the cooling fins of a lamination may be arranged such that they fit within a notional rectangle (or square) having at least two sides with a length substantially equivalent to a diameter of the annular body. This may be achieved by extending the cooling fins into corners of the rectangle. This may help to ensure efficient usage of material, by allowing cooling fins to be formed without requiring the size of a sheet of material from which the laminations are produced to be increased.

In one embodiment, at least some of the laminations comprise four groups of cooling fins. Preferably one group of cooling fins is diametrically opposed to another group of cooling fins. Thus, a centre of one group of cooling fins may be spaced from a centre of an adjacent group of cooling fins by approximately 90°. This can allow the cooling fins to extend into each of the corners of a notional rectangle or square encompassing the lamination, thereby ensuring efficient usage of material. In this case, successive packs of laminations may be indexed by 45° (or an odd multiple thereof), optionally plus or minus an amount sufficient to ensure alignment of the stator slots.

In one embodiment, at least one group of cooling fins has a beveled corner. For example, where a lamination comprises two groups with a different number of fins, a group with a larger number of fins may have a beveled corner (or corners). This may be achieved, for example, by arranging a circumferentially outer cooling fin in a group of fins to be shorter in a radial direction than a middle fin in the same group of fins and/or at least part of the peripheral connecting member (such as an outer part circumferentially) to be at a non-zero angle to the circumferential direction (as well as the radial). This may help to ensure that a group of cooling fins fit within a notional rectangle encompassing the lamination, thereby helping to ensure efficient usage of material.

Preferably each lamination has substantially the same shape. This may help to simplify manufacturing by only requiring one type of lamination to be produced. In this case, staggering of the cooling fins may be achieved through indexing of the laminations (i.e. rotating some laminations with respect to other laminations about their axis). Thus, some of the laminations may be indexed with respect to other laminations such that a cooling fin in one lamination is interposed between two cooling fins in a group of cooling fins in another lamination.

However it would also be possible for some of the laminations to have a different shape and/or for some of the laminations to have no cooling fins, or a reduced number of cooling fins. This may be desirable, for example, in circumstances where space constraints restrict the areas where cooling fins can be located.

Typically a stator of an electrical machine is located in a stator frame using landing bars. Therefore the stator may comprise landing bar slots for accommodating landing bars. Preferably the landing bar slots are defined between groups of fins of successive laminations in an axial direction. This may be achieved by appropriate indexing of the laminations or groups of laminations. This may allow landing bar slots to be provided without requiring additional features in the laminations, which may facilitate manufacture.

Alternatively, the groups of cooling fins themselves may be used to locate the stator core within the stator frame without the use of landing bars.

In any of the above arrangements, if desired, the stator core may be skewed, that is, the stator slots may run through the stator core at a (non-zero) angle to the axial direction. The amount of skewing may be, for example, one or two stator slots, or some other value. The skewing may be achieved, for example, by appropriate rotation of successive laminations or packs of laminations.

According to another aspect of the present invention there is provided a stator for a rotating electrical machine, the stator comprising a stack of stator laminations forming a stator core, wherein:
  a lamination comprises a plurality of cooling fins arranged in at least one group of at least two fins;
  the cooling fins in a group are connected by a peripheral connecting member; and
  a cooling fin in one lamination is interposed between two cooling fins in a group of cooling fins in another lamination.

According to a further aspect of the invention there is provided a rotating electrical machine comprising a stator in any of the forms described above.

Corresponding methods may also be provided. Thus, according to another aspect of the invention, there is provided a method of manufacturing a stator for a rotating electrical machine, the method comprising:
  forming a plurality of stator laminations, wherein a lamination comprises a plurality of cooling fins arranged in at least one group of at least two fins and the cooling fins in a group are connected by a peripheral connecting member;
  arranging the laminations in packs of at least one lamination;
  indexing the packs of laminations such that a group of fins in one pack of laminations lies circumferentially between two adjacent groups of fins in an adjacent pack of laminations and a cooling fin in one pack of laminations is interposed between two cooling fins in a group of cooling fins in another pack of laminations; and
  stacking the packs of laminations to form a stator core.

Features of one aspect of the invention may be applied to any other aspect. Any of the apparatus features may be provided as method features and vice versa.

In this specification, terms such as "axially", "radially", "circumferentially" and so forth are generally defined with reference to the axis of rotation of the electrical machine, unless the context implies otherwise.

Preferred embodiments of the invention will now be described, purely by way of example, with reference to the accompanying drawings, in which.

Figure 1:
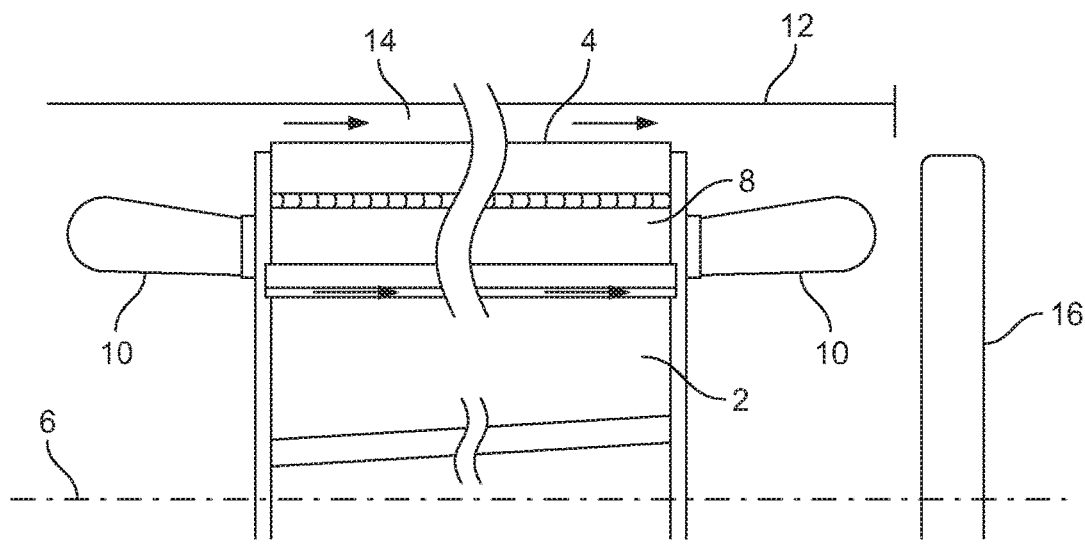
FIG. 1 is a radial cross section through part of a rotating electrical machine.

FIG. 1 is a radial cross section through part of a rotating electrical machine. The machine comprises a rotor 2 located inside a stator 4 with an air gap between the two. The rotor 2 is mounted on a shaft with an axis of rotation indicated by the dashed line 6. The stator 4 comprises a stator core 8 with slots on its inner circumference in which are wound stator windings. The stator windings run through the slots in a substantially axial direction. End windings 10 extend out of the stator slots and around the outside of the stator core in a substantially circumferential direction. The stator 4 is contained within a stator frame 12. Optionally, landing bars (not shown in FIG. 1) may be attached to the stator frame 12. The landing bars run through the machine in an axial direction and engage with the stator core 8 on its outer circumference in order to locate the stator core within the stator frame. The landing bars create air gaps 14 between the stator core 8 and the stator frame 12. A shaft-driven fan 16 is located at the drive end of the machine, in order to draw cooling air through the machine. This air flow is predominately in an axial direction through the rotor/stator air gap and the stator/frame air gap 14, as indicated by the arrows in FIG. 1. If desired, an external, independently-driven fan or fans or any other appropriate means of drawing air through the machine could be used instead of a shaft driven fan.

In a rotating electrical machine such as that shown in FIG. 1, the stator is usually formed from a plurality of stator laminations. The laminations are usually stamped from a sheet of metal, and then stacked together in an axial direction through the machine.

Figure 2:
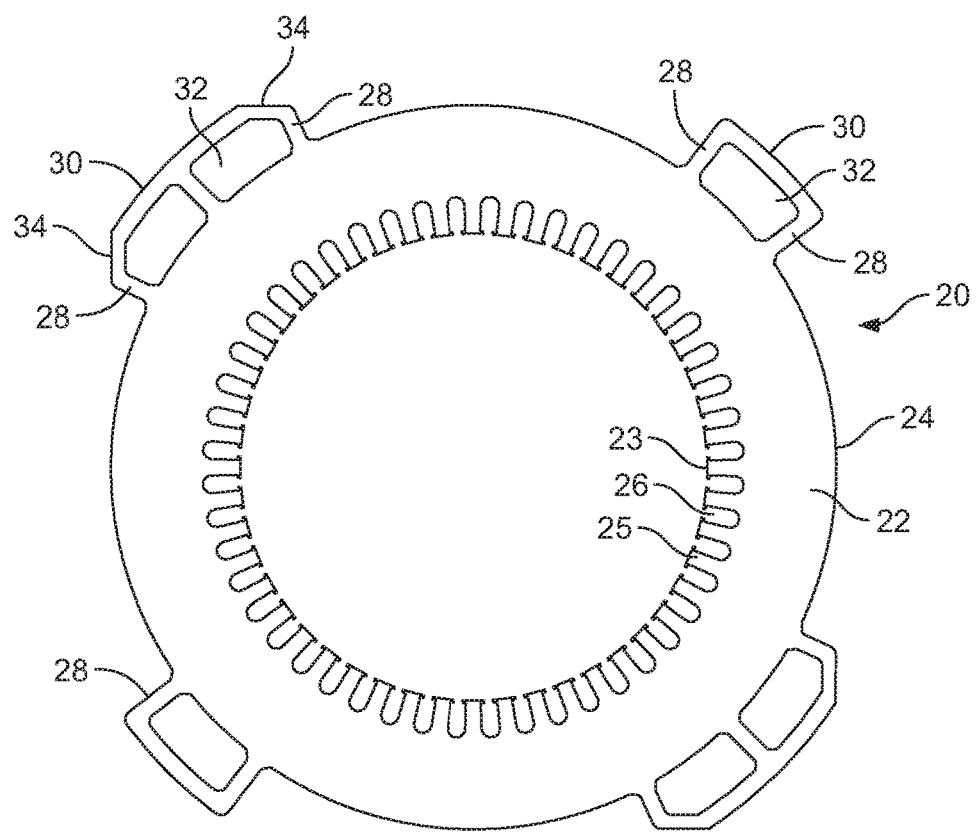
FIG. 2 shows a stator lamination in an embodiment of the invention.

FIG. 2 shows a stator lamination in an embodiment of the present invention. Referring to FIG. 2, the lamination 20 comprises an essentially annular body 22, with an inner edge 23 and an outer edge 24. A plurality of teeth 25 are provided on the radially inner side of the annular body 22. The teeth 25 define stator slots 26 which are designed to hold stator windings.

In the arrangement of FIG. 2, the lamination 20 comprises a plurality of cooling fins 28. The cooling fins 28 extend radially outwards from the outer edge 24 of the annular body 22. The cooling fins are arranged in groups, with the fins in a group connected by a peripheral connecting member 30. The peripheral connecting members 30 extend in a circumferential direction between the radially outward parts of the fins in a group, with a gap between a peripheral connecting member 30 and the outer edge 24 of the annular body 22. Thus gaps or apertures 32 are defined between, on one hand, two adjacent fins 28 in a group, and on the other hand between the outer edge 24 of the annular body 22 and a peripheral member 30. The spacing in a circumferential direction between the fins of a group is approximately equal. Thus, at least within a group, each of the apertures 32 has approximately the same width in a circumferential direction.

In the arrangement shown, four groups of fins are provided. The groups of fins are evenly spaced about the lamination in a circumferential direction. Thus, the centre of each group of fins is spaced approximately 90° in a circumferential direction from the adjacent group. Two of the groups have two fins connected by a peripheral member, while two of the groups have three fins connected by a peripheral member. The groups of three fins have a fin located at the centre of the group circumferentially, and two fins located on either side circumferentially. The groups of two fins have the fins located on either side of the centre of the group circumferentially. The groups with the same number of fins are diametrically opposed (spaced by) 180°.

In the arrangement shown, the distance between two adjacent groups of fins in a circumferential direction is greater than the width of a group of fins in a circumferential direction. As a consequence, when assembling the stator, it is possible to rotate one lamination relative to another such that a group of fins in one lamination lies circumferentially between two adjacent groups of fins in another lamination. The circumferential width of a group of three fins is greater than the circumferential width of a group of two fins. In the present example, a group of three fins has a width which extends through an angle of approximately 36° and a group of two fins has a width which extends through an angle of approximately 23°, although of course other values could be used instead.

Within each group of fins, the peripheral connecting member 30 is essentially in the form of an arc which extends in a generally circumferential direction, bridging the cooling fins of a group. However, in the case of a group of three fins, the corners of the group are beveled, that is, at a slope to the circumferential and the radial. This is achieved by arranging the outer fins (circumferentially) to be shorter in a radial direction than the middle fin. In this case, the peripheral connecting member 30 comprises an angled portion 34 at each end circumferentially, adjacent to the outer fins. Each angled portion 34 is angled radially inwards as it approaches an outer fin in a circumferential direction. In particular, the angled portion 34 is substantially tangential to a point on the outer edge 24 of the annular body 24 which lies halfway between the centre of that group of fins and the centre of the adjacent group of fins (i.e. a point which is approximately 45° from the centre of the group of fins circumferentially). This arrangement can help to reduce the amount of scrap material which is discarded when the lamination is produced.

The laminations for a stator core are usually punched from a roll of electrical steel. Electrical steel is a commercially available product which is generally supplied in rolls of certain widths. Successive laminations are usually punched from the roll using a punching press. Thus, each lamination is typically punched from an area of the roll which is substantially square or rectangular in shape.

Figure 3:
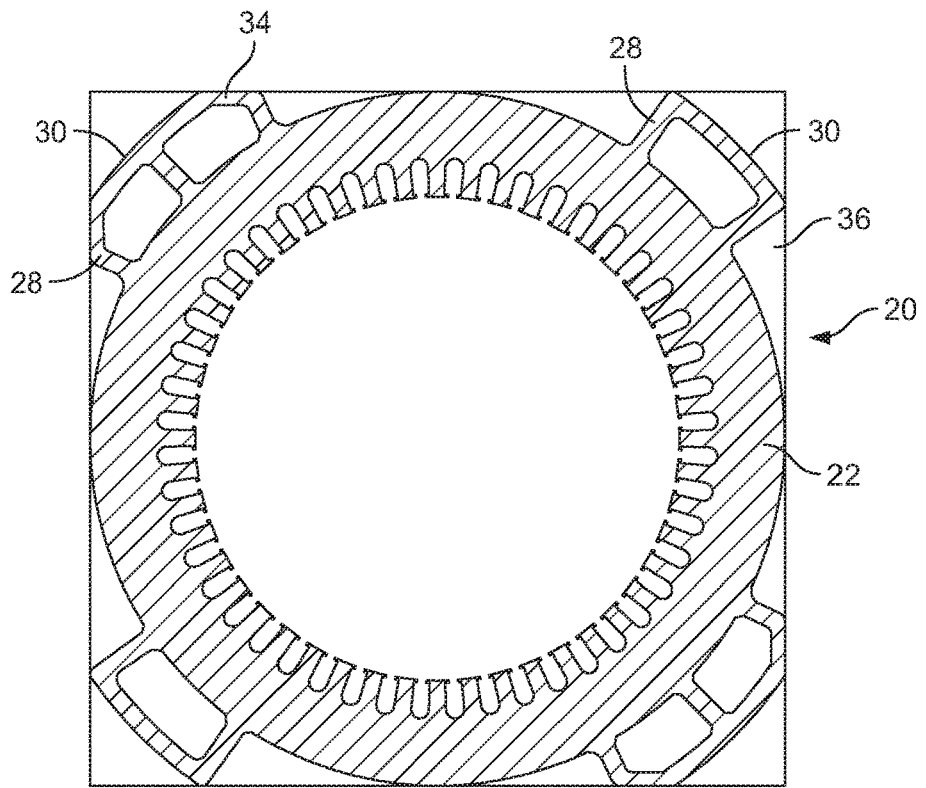
FIG. 3 shows schematically how a lamination can be stamped from a sheet of metal.

FIG. 3 shows schematically how a lamination can be stamped from a sheet of metal. Referring to FIG. 3, the outline of a lamination 20 is shown on a sheet of metal 36 from which the lamination is stamped. The lamination fits within a notional square of material having sides of whose lengths are equivalent to the diameter of the annular body 22 of the lamination. Each of the groups of fins is located in a corner of the notional square. Thus, the fins 28 and peripheral connecting members 30 are located in parts of the material which would otherwise be discarded as scrap. Furthermore, in the groups of three fins, the reduced height of the outer fins and the angled portions 34 of the peripheral members ensures that they stay within the envelope of the notional square. This arrangement therefore allows the cooling fins to be produced from parts of the material which would otherwise be discarded as scrap, without increasing the overall envelope of the lamination on the sheet of metal.

During manufacture of the electrical machine, the laminations are stacked together to form the stator core. Different laminations or groups of laminations can be rotated (indexed) with respect to each other, in order to produce a desired pattern of cooling fins in an axial direction through the machine.

Figure 4:
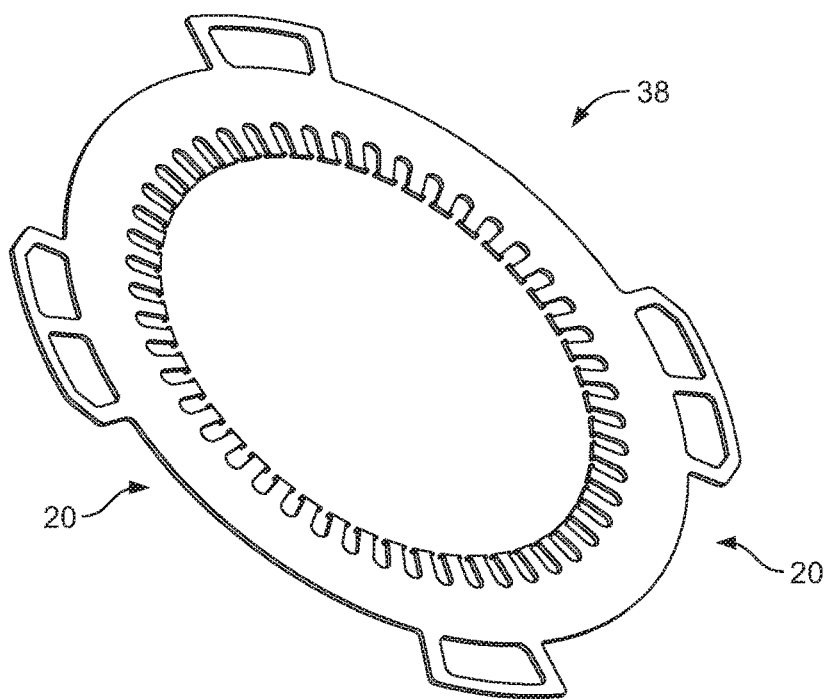
FIGS. 4 through 8 show how successive laminations can be stacked to form a stator core in one embodiment.

FIGS. 4 through 8 show how successive laminations can be stacked to form a stator core in one embodiment. Referring to FIG. 4, in a first step, a number N of laminations 20 are first aligned and placed on top of each other to form a first core pack (group of laminations) 38 having a certain thickness. The number N may be any positive integer, such as one, two, three, four, five, six, seven, eight or more. In general, the number N is chosen to ensure that the cooling fins have sufficient mechanical strength in the assembled stator. Since the fins are aligned, the core pack comprises cooling fins and peripheral connecting members which have a thickness in an axial direction equivalent to the thickness of N stator laminations.

Figure 5:
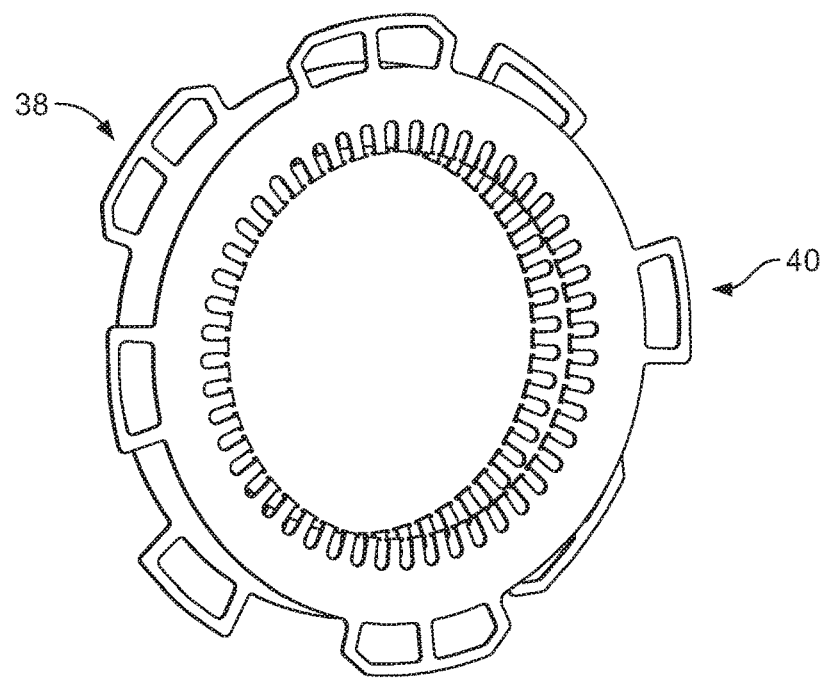

Referring to FIG. 5, in a next step, a second core pack 40 is formed from a second set of laminations. The number of laminations in the second core pack may be the same as or different from that in the first core pack. The second core pack 40 is then rotated about its axis through 45° relative to the first core pack 38. As a consequence, each group of fins in one core pack lies circumferentially between two groups of fins in the other core pack. The second core pack 40 is then added to the first core pack 38.

Figure 6:
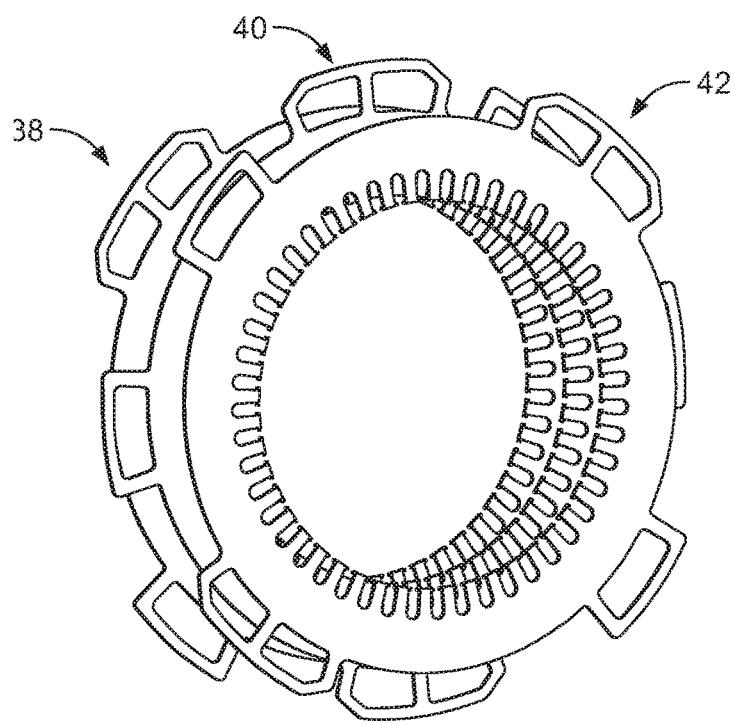

Referring to FIG. 6, in a next step, a third core pack 42 is formed from a third set of laminations. The third core pack is rotated about its axis through an angle of 90° relative to the first core pack (45° relative to the second core pack). As a consequence, a group of two fins in the third core pack 42 is aligned circumferentially with a group of three fins in the first core pack 38, and vice versa. The third core pack 42 is then added to the first and second core packs.

Figure 7:
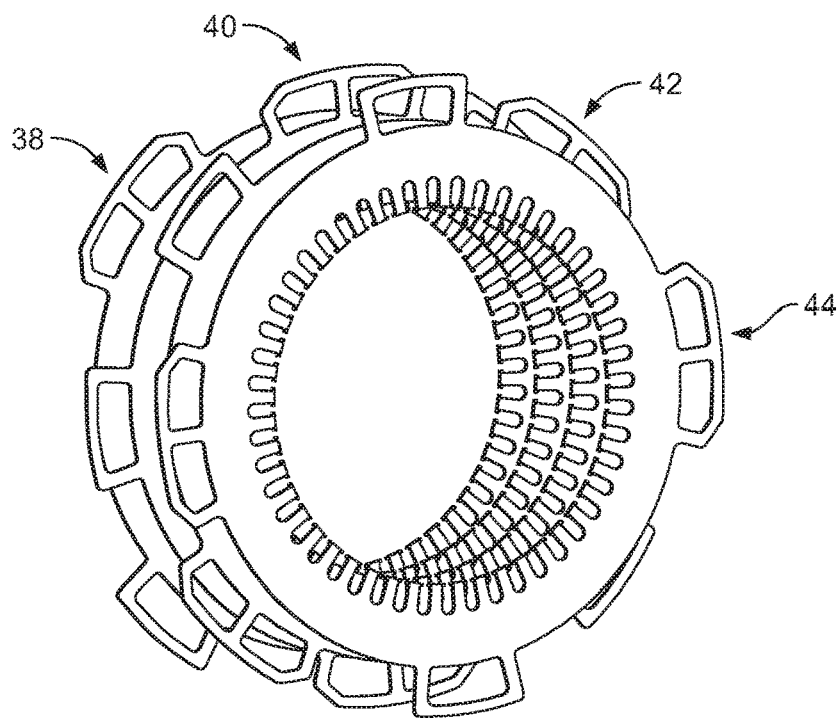

Referring to FIG. 7, in a next step, a fourth core pack 44 is formed from a fourth set of laminations. The fourth core pack is rotated about its axis through an angle of 135° relative to the first core pack (90° relative to the second core pack and 45° relative to the third). As a consequence, a group of two fins in the fourth core pack 44 is aligned circumferentially with a group of three fins in the second core pack 40, and vice versa. However, the groups of fins in the second and fourth core packs lie circumferentially between the groups of fins in the first and third core packs, and vice versa. The fourth core pack 44 is then added to the other core packs.

Figure 8:
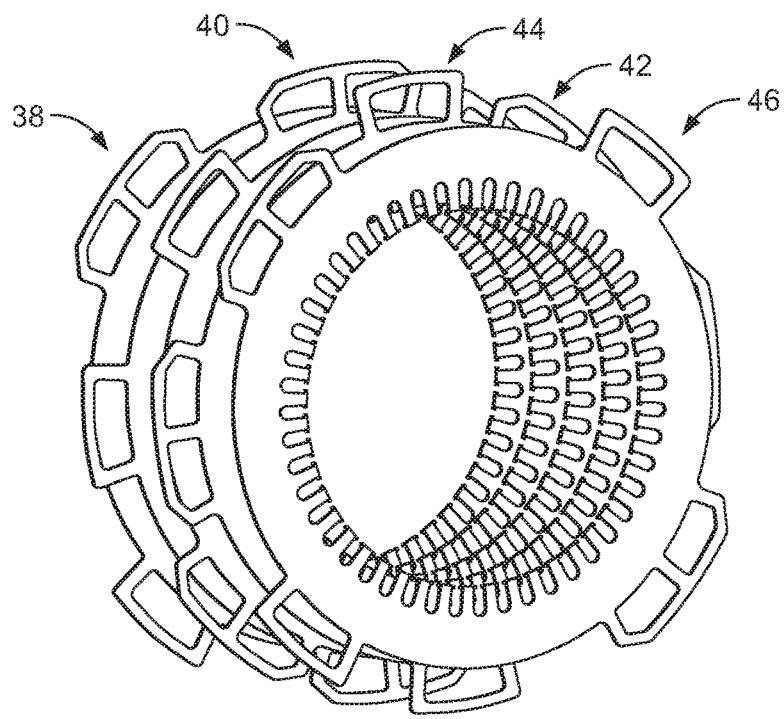

Referring to FIG. 8, in a next step, a fifth core pack 46 is formed from a fifth set of laminations. The fifth core pack is rotationally aligned with the first core pack, or rotated through 180°. Although in principle the laminations have rotational symmetry, in practice there may be slight variations in the sheet metal used to form the laminations, and therefore a rotation through 180° may be preferred to even out any inconsistencies. The steps shown in FIGS. 4 through 8 are then repeated, adding successive core packs rotated by 45° until a stator core of the required depth is obtained. The stator core is then assembled in a rotating electrical machine such as that shown in FIG. 1.

In the arrangement of FIGS. 2 through 8, the stator has 48 stator slots, and thus the stator slot pitch (the angular distance between adjacent slots) is 7.5°. In this case the stator slots will be aligned after a 45° rotation, since 45° is a multiple of the stator slot pitch. However, if necessary, the exact amount of rotation between successive core packs can be adjusted to ensure that the slots are aligned if a different number of stator slots and/or a different stator slot pitch is used.

Figure 9:
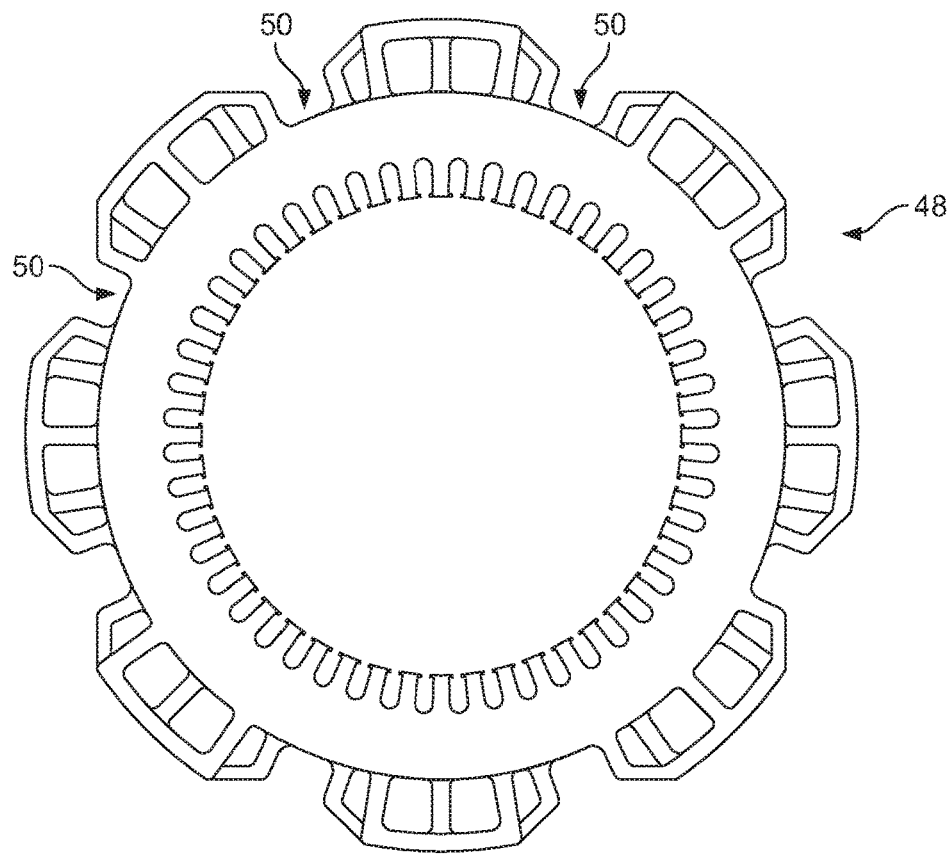
FIG. 9 is an end view of the assembled stator core.

FIG. 9 shows an end (axial) view of the assembled stator core 48. Referring to FIG. 9, it can be seen that the fins in one core pack are staggered circumferentially with respect to the fins in adjacent core packs. The fins in a group of two fins in one core pack are located between adjacent fins in a group of three fins in adjacent core packs. In addition, slots 50 are provided which run in an axial direction between groups of fins in the various core packs. The slots can be used to locate landing bars.

Figure 10:
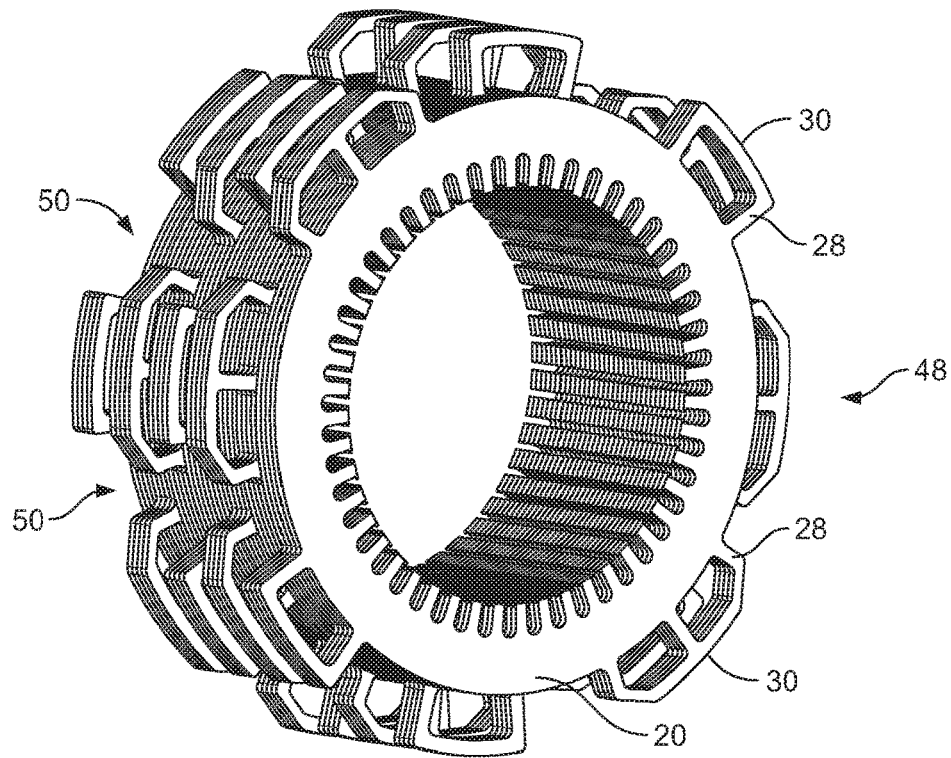
FIG. 10 is a perspective view of the stator core.

FIG. 10 is a perspective view of a stator core in one embodiment. In this embodiment, the stator core 48 is formed from eight core packs (groups of laminations) each of which comprises four laminations. Referring to FIG. 10, it can be seen that a group of fins in one core pack lies circumferentially between two groups of fins in an adjacent core pack such that, when considering a path running in an axial direction through the stator core, a group of fins is encountered every second core pack. Furthermore, the fins are staggered circumferentially such that when, considering a path running in an axial direction through the stator core, a cooling fin is encountered every fourth core pack. As consequence, each fin has an axial cooling channel to either side, as well as a space in front and to the rear. This can assist in the transfer of heat from the stator core to a cooling fluid.

In this embodiment, landing bar slots 50 are also provided which run in an axial direction between groups of fins in the various core packs.

In operation of the rotating electrical machine, air is caused to flow in a generally axial direction over the surface of the stator by a fan. In doing so, the air flows between and around the cooling fins. Air flow between and around the cooling fins transfers heat from the stator core to the air. Furthermore, the staggered nature of the fins introduces turbulence into the airflow, assisting with the cooling.

It has been found that the cooling fin arrangement described above can provide various advantages over previously considered arrangements. Firstly, the staggered nature of the cooling fins helps with the transfer of heat from the stator core, thereby helping to cool the stator. Secondly, the peripheral connecting members increase the surface area which is exposed to cooling air, which also helps to improve the cooling. Thirdly, the peripheral connecting members help to provide structural rigidity, which can help with the mechanical properties of the machine. Fourthly, each lamination has the same shape, and the staggered cooling fins are achieved by the appropriate indexing. This avoids the need to stamp different types of laminations, which simplifies the manufacturing process. Fifthly, the lamination design is efficient from a material usage point of view since the fins and peripheral connecting members can be produced from material which would otherwise be scrap. Sixthly, the lamination design allows slots for landing bars to be provided without the need for special features in the laminations. Thus, the described arrangement can allow a good thermal performance to be achieved while at the same time providing good mechanical strength and being cost effective to manufacture.

In the arrangement described above, eight landing bar slots 50 are provided at spaced locations around the stator. However, if desired, a different number of landing bar slots can be obtained through appropriate indexing of the laminations.

Figure 11:
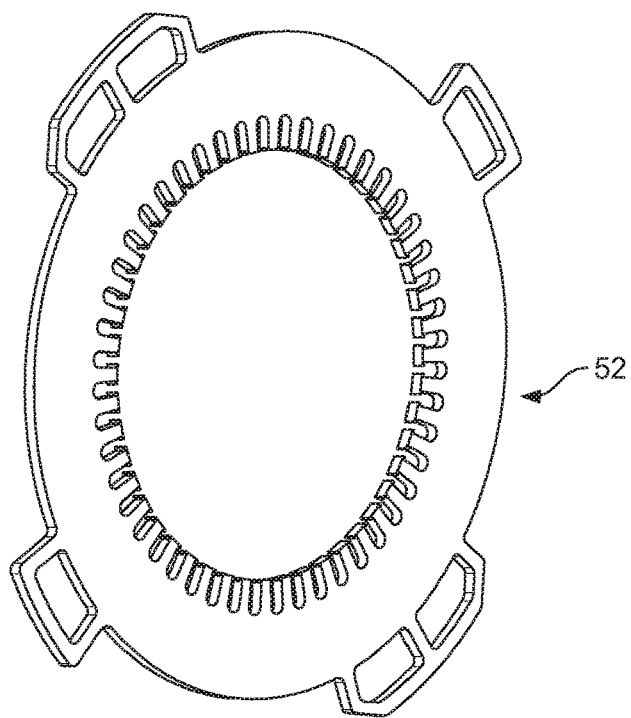
FIGS. 11 through 13 show how successive laminations may be stacked to form a rotor core in another embodiment.
Figure 12:
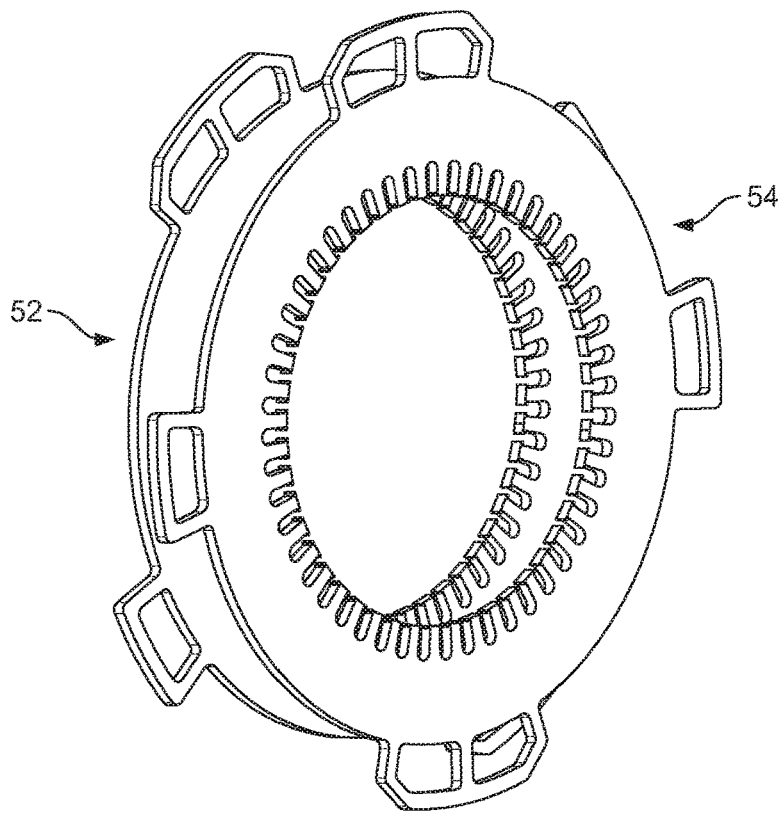
Figure 13:
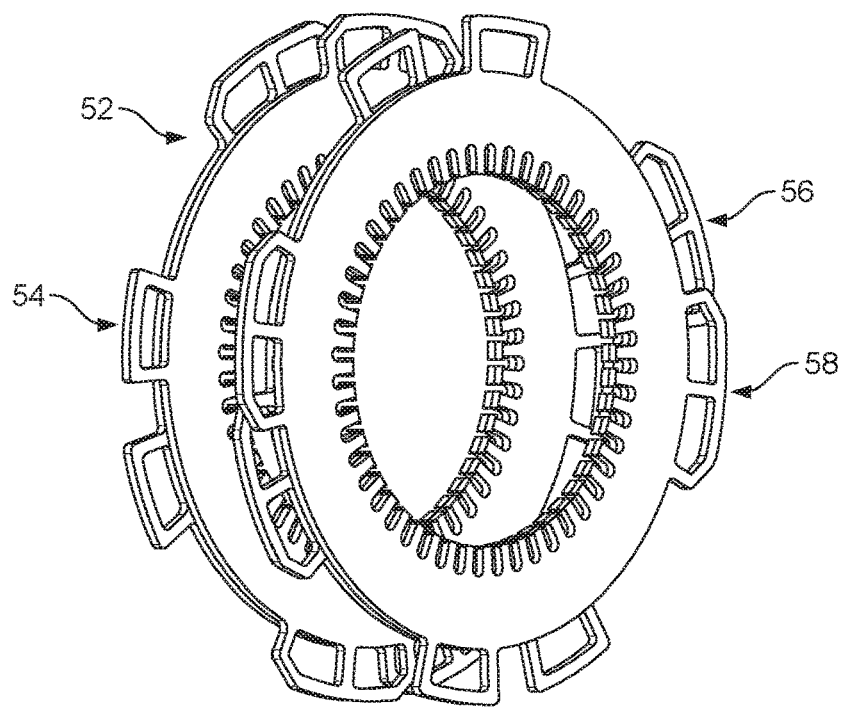

FIGS. 11 through 13 show how successive laminations may be stacked to form a rotor core in another embodiment. In this embodiment, the laminations are indexed so as to provide four landing bar slots.

Referring to FIG. 11, in a first step, a number N of laminations are first aligned and placed on top of each other to form a first core pack (group of laminations) 52 having a certain thickness. The number N may be any positive integer, such as one, two, three, four or more.

Referring to FIG. 12, in a next step, a second core pack 54 is formed from a second set of laminations. The second core pack is rotated about its axis through an angle which is less than 45°, but sufficient for there to be a circumferential gap between the groups of fins in the two core packs. As a consequence, the distance in a circumferential direction between groups of fins in the respective core packs having the same number of fins is less than that between groups of fins having a different number of fins. The second core pack 54 is then added to the first core pack 52.

Referring to FIG. 13, in a next step, a third core pack 56 is formed from a third set of laminations. The third core pack is rotated about its axis through an angle of 90° relative to the first core pack. As a consequence, a group of two fins in the third core pack 56 is aligned circumferentially with a group of three fins in the first core pack 52, and vice versa. The third core pack 56 is then added to the first and second core packs.

Still referring to FIG. 13, in a next step, a fourth core pack 58 is formed from a fourth set of laminations. The fourth core pack is rotated about its axis through an angle of 90° relative to the second core pack (that is, an angle relative to the first core pack which is equivalent to the angle of rotation of the second core pack plus) 90°. As a consequence, a group of two fins in the fourth core pack 58 is aligned circumferentially with a group of three fins in the second core pack 54, and vice versa. The fourth core pack 58 is then added to the other core packs.

The steps shown in FIGS. 11 through 13 are then repeated, adding successive core packs rotated through the appropriate angle until a stator core of the required depth is obtained.

Figure 14:
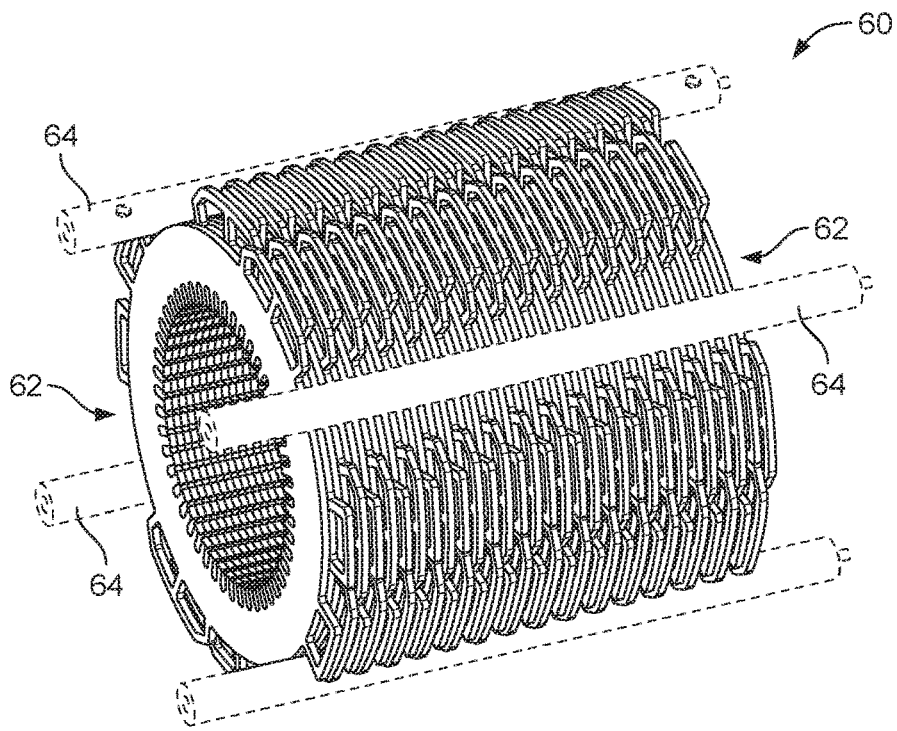
FIG. 14 is a perspective view of the assembled stator core.

FIG. 14 is a perspective view of a stator core in the above embodiment. Referring to FIG. 14, the stator core 60 is formed from successive core packs, indexed and stacked together axially. In the arrangement of FIG. 14, the fins are staggered circumferentially, as in the previous embodiment. However, in this embodiment, four landing bar slots 62 are provided. Also shown in FIG. 14 are landing bars 64 located in the landing bar slots.

FIG. 14 also shows how a skewed stator can be achieved through appropriate rotation of the laminations. Skewing the stator is a known technique which can help to improve the harmonic performance of the electrical machine. In a skewed stator, the stator slots (and hence the stator windings) run in a direction which is slightly offset from the axial direction. Typically, the amount of skewing is one stator slot over the core length. In this case, each lamination (or core pack) is rotated slightly with respect to adjacent laminations (or core packs) in order to achieve the skewing.

Figure 15:
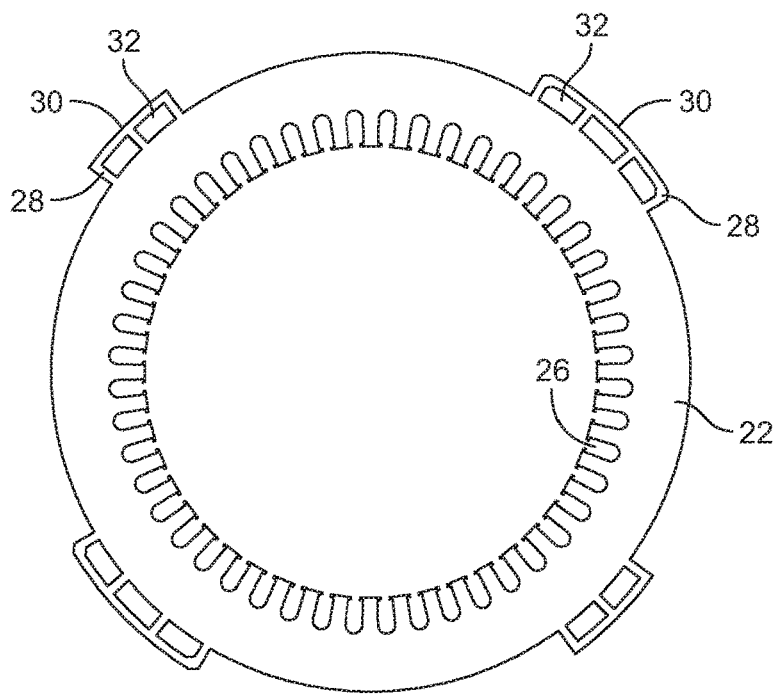
FIG. 15 shows a stator lamination in another embodiment.

FIG. 15 shows a stator lamination in another embodiment of the invention. In the arrangement of FIG. 15, each lamination comprises an essentially annular body 22 with a plurality of stator slots 26. A plurality of cooling fins 28 are provided, which extend radially outwards from the annular body 22. As in previous embodiments, the cooling fins are arranged in groups, with the fins of a group connected by peripheral connecting members 30. Apertures 32 are defined between adjacent fins 28 in a group. However, in this embodiment, two of the groups have three fins connected by a peripheral connecting member, while two of the groups have four fins connected by a peripheral connecting member. The centre of each group of fins is spaced approximately 90° in a circumferential direction from the adjacent group, and the groups with the same number of fins are diametrically opposed (spaced by 180°).

Figure 16:
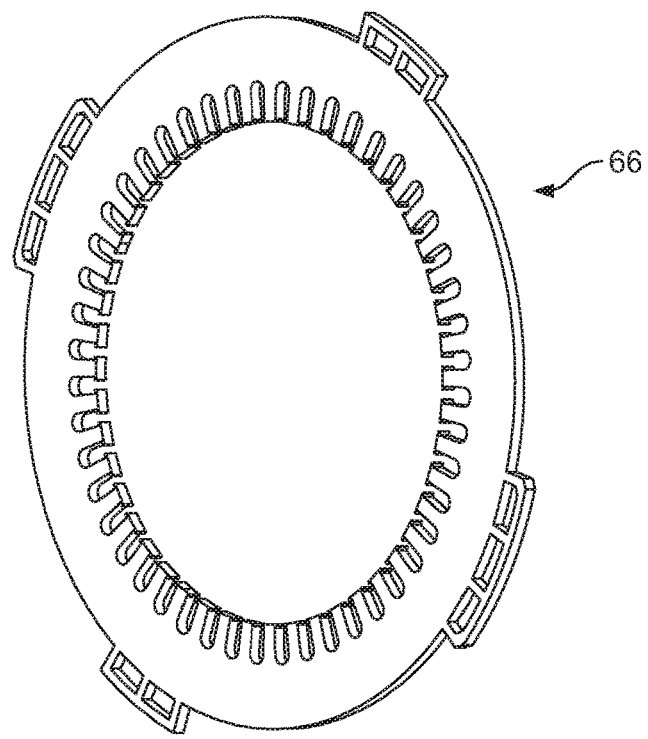
FIGS. 16 through 18 show how successive laminations can be stacked to form a rotor core in another embodiment.
Figure 17:
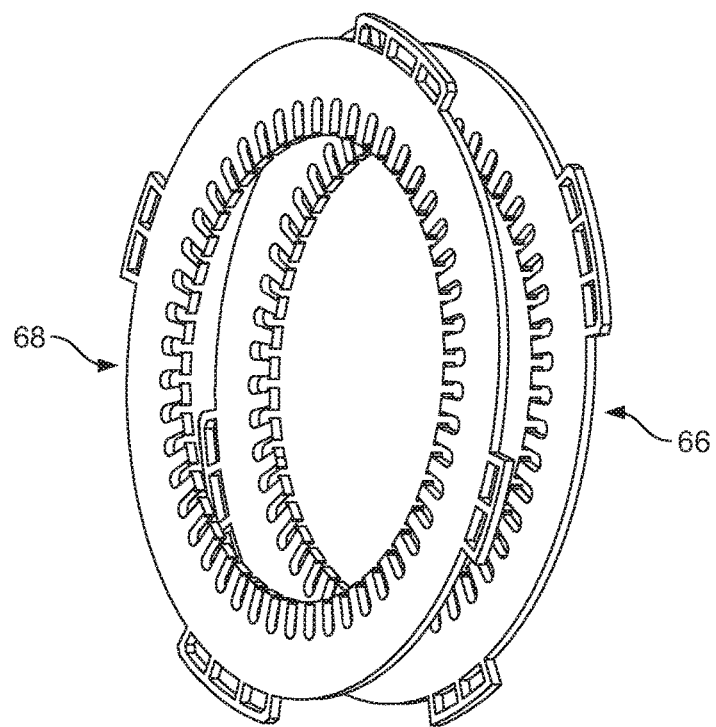
Figure 18:
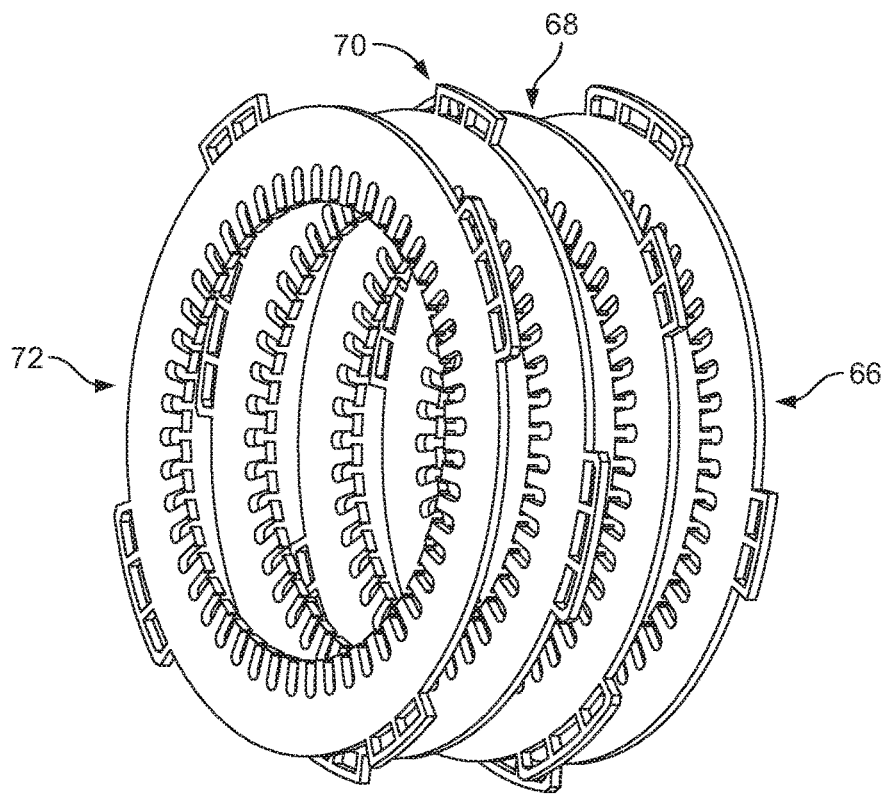

FIGS. 16 through 18 show how successive laminations may be stacked to form a rotor core in this embodiment. Referring to FIG. 16, in a first step, a number N of laminations are first aligned and placed on top of each other to form a first core pack 66 having a certain thickness. The number N may be any positive integer, such as one, two, three, four or more.

Referring to FIG. 17, in a next step, a second core pack 68 is formed from a second set of laminations. The second core pack is rotated about its axis through 45° relative to the first core pack. As a consequence, each group of fins in one core pack lies circumferentially between two adjacent groups of fins in the other core pack. The second core pack 68 is then added to the first core pack 66.

Referring to FIG. 18, in a next step, a third core pack 70 is formed from a third set of laminations. The third core pack is rotated about its axis through an angle of 90° relative to the first core pack. As a consequence, a group of four fins in the third core pack is aligned circumferentially with a group of three fins in the first core pack, and vice versa. The third core pack 70 is then added to the first and second core packs.

Still referring to FIG. 18, in a next step, a fourth core pack 72 is formed from a fourth set of laminations. The fourth core pack is rotated about its axis through an angle of 135° relative to the first core pack (90° relative to the second core pack). As a consequence, a group of three fins in the fourth core pack is aligned circumferentially with a group of four fins in the second core pack, and vice versa. However, the groups of fins in the second and fourth core packs lie circumferentially between the groups of fins in the first and third core packs, and vice versa. The fourth core pack 72 is then added to the other core packs.

The steps shown in FIGS. 16 through 18 are then repeated, adding successive core packs rotated by 45° until a stator core of the required depth is obtained.

Figure 19:
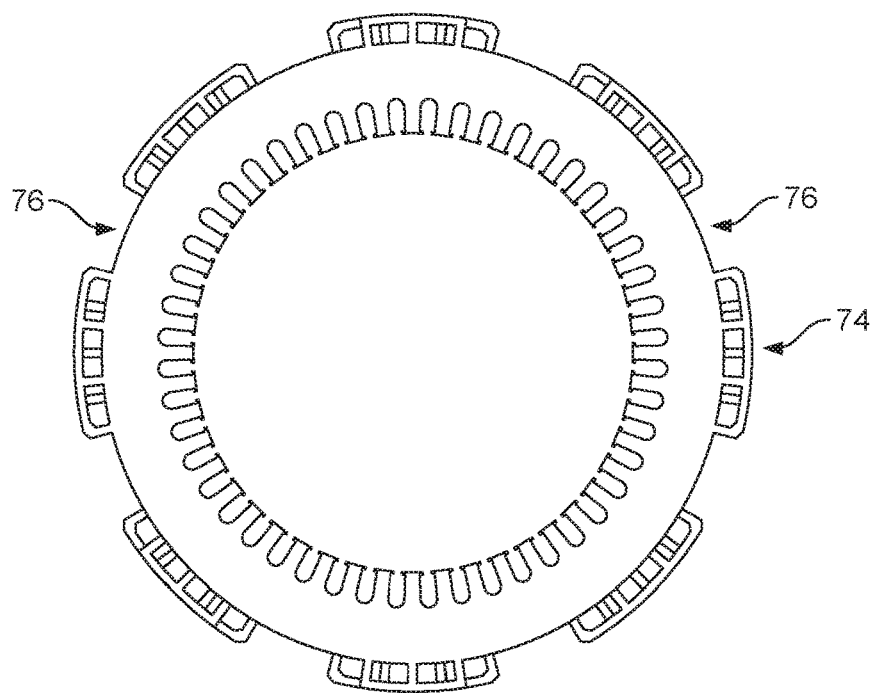
FIG. 19 is an end view of the assembled stator core.

FIG. 19 shows an end view of the assembled stator core 74. It can be seen that the fins in one core pack are staggered circumferentially with respect to the fins in adjacent core packs. The fins in a group of three fins in one core pack are located between adjacent fins in a group of four fins in adjacent core packs. In addition, landing bar slots 76 are provided which run in an axial direction between groups of fins in the various core packs.

Figure 20:
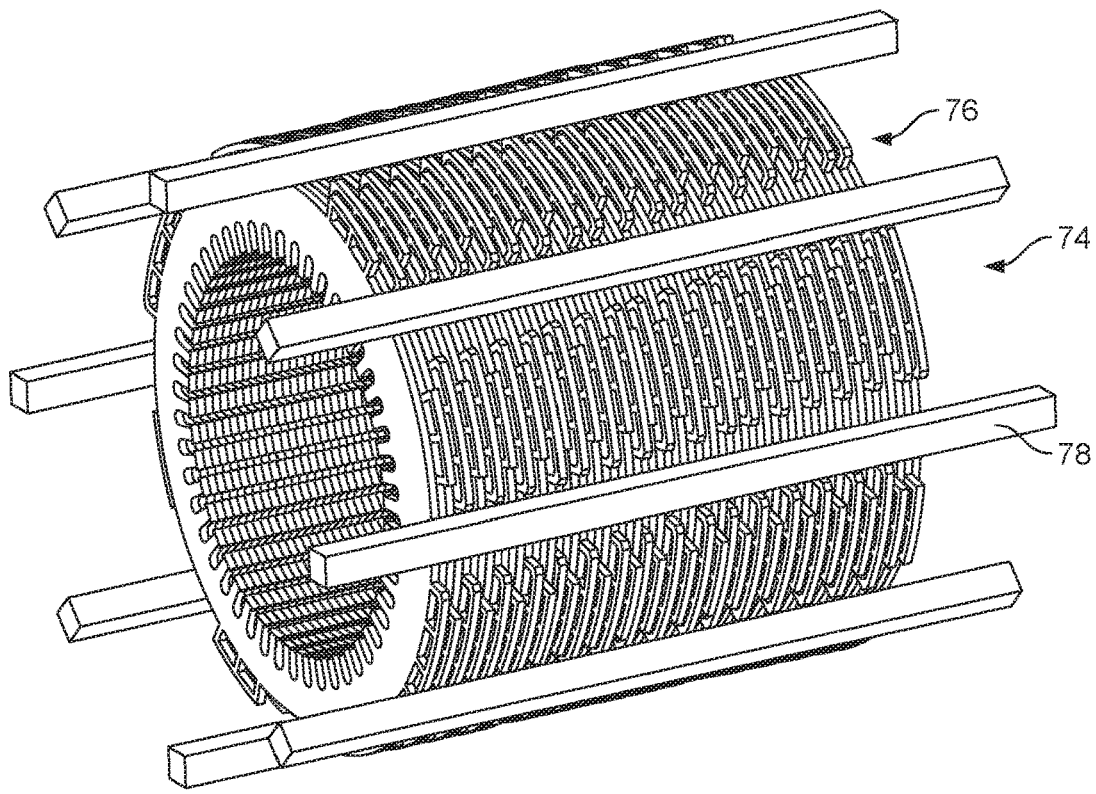
FIG. 20 is a perspective view of the stator core.

FIG. 20 is a perspective view of a stator core in this embodiment. Referring to FIG. 20, the stator core 74 is formed from successive core packs, indexed and stacked together axially. The fins are staggered circumferentially such that, when considering a path running in an axial direction through the stator core, a cooling fin is encountered every fourth core pack. As consequence, each fin has an axial cooling channel to either side, as well as a space in front and to the rear. This can assist in the transfer of heat from the stator core to a cooling fluid. FIG. 20 also shows landing bars 78 located in the landing bar slots 76. The stator of FIG. 20 is also skewed, which is achieved through appropriate rotation of the laminations.

It has been found that increasing the number of fins per group in the way shown in FIGS. 15 through 20 may increase the total amount of cooling due to the increased number of fins and/or may improve the mechanical stability of the fins.

It will be appreciated that, in the embodiment described above, the laminations could be indexed by a different amount in order to provide a different number of landing bar slots, for example in a similar way to that described above with reference to FIGS. 11 through 13.

Figure 21:
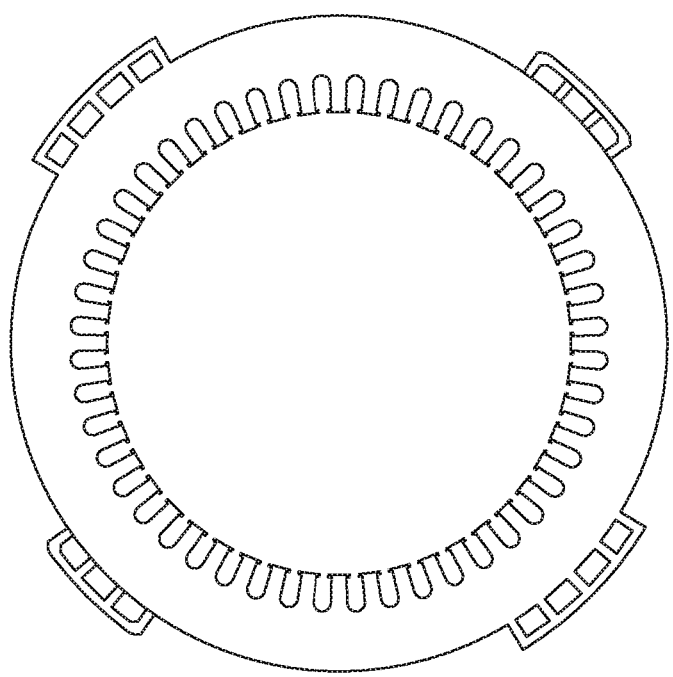
FIG. 21 shows a stator lamination in a further embodiment.

FIG. 21 shows a stator lamination in a further embodiment. In this embodiment, two groups of fins have four fins and two groups of fins have five fins. As in previous embodiments, the centre of each group of fins is spaced approximately 90° in a circumferential direction from the adjacent group, and the groups with the same number of fins are spaced by 180°. A plurality of such laminations may be used to form a stator core in a similar way to that described above in the previous embodiments. It will be appreciated that groups of fins having other numbers of fins are also possible.

Figure 22:
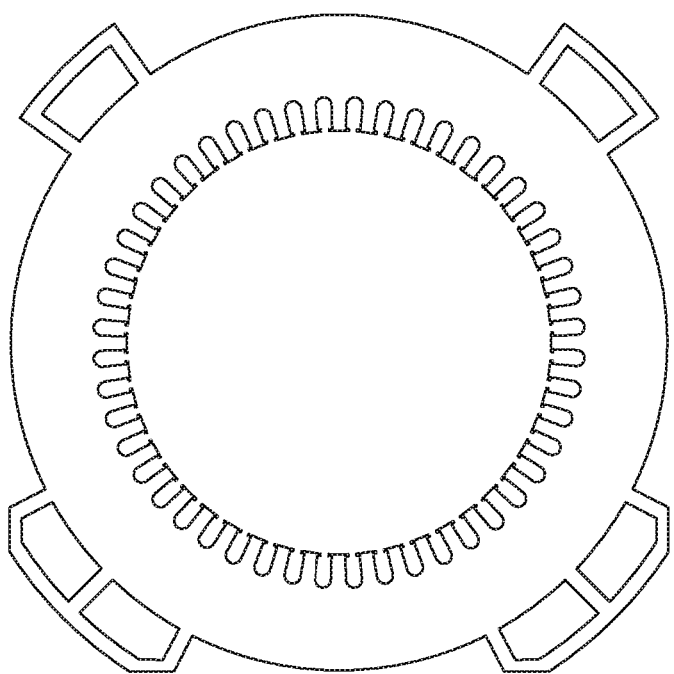
FIGS. 22 through 24 show other possible configurations of a stator lamination.
Figure 23:
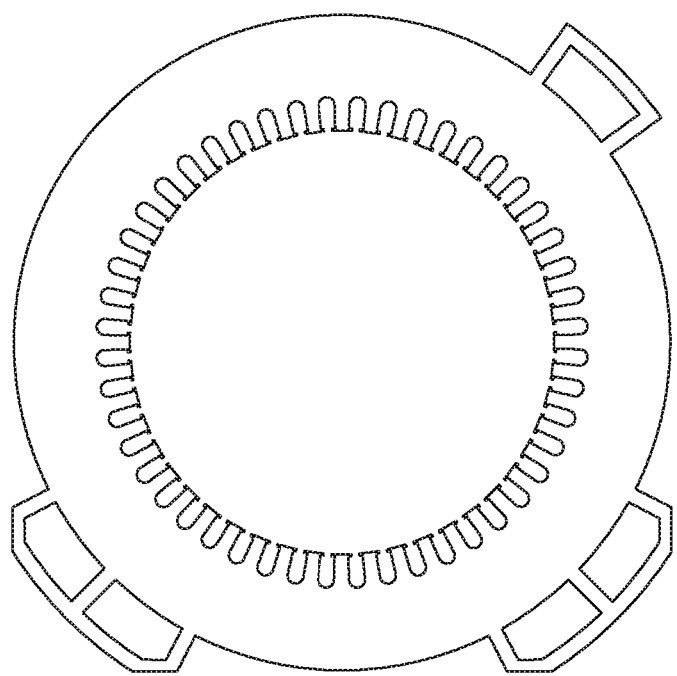
Figure 24:
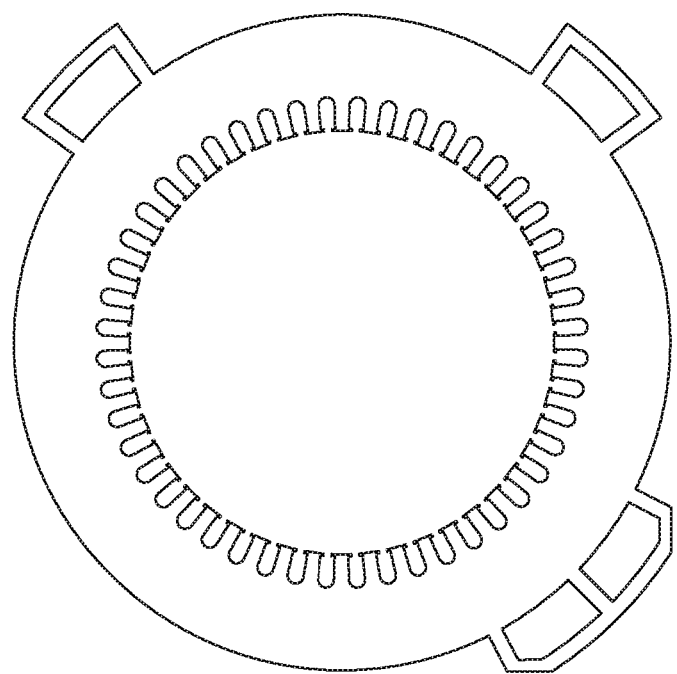

FIGS. 22 through 24 show other possible configurations of a stator lamination which may be used depending on the circumstances. In each case, a laminated stator core may be obtained by stacking a plurality of laminations with the appropriate indexing. The arrangement of FIG. 23 or 24 may be used, for example, where there are space restrictions on one side of the stator core.

Figure 25:
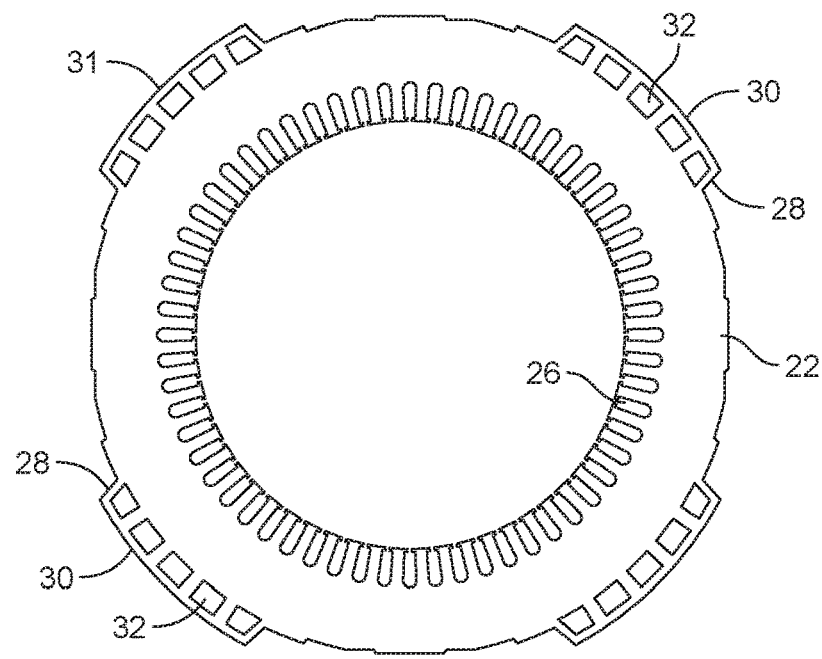
FIGS. 25 and 26 show a stator lamination and an assembled stator core in another embodiment.

FIG. 25 shows a stator lamination in a further embodiment of the invention. As in previous embodiments, the lamination comprises an essentially annular body 22 with a plurality of stator slots 26. In this embodiment, the stator has 60 stator slots, with a stator slot pitch of 6°. A plurality of cooling fins 28 are provided, which extend radially outwards from the annular body 22. The cooling fins are arranged in four groups, with the fins of a group connected by peripheral connecting members 30. Each of the groups has six fins connected by a peripheral connecting member. Apertures 32 are defined between adjacent fins 28 in a group. The groups of fins are spaced 90° apart around the periphery of the lamination. In this embodiment, each of the groups of fins is essentially the same as the others.

Figure 26:
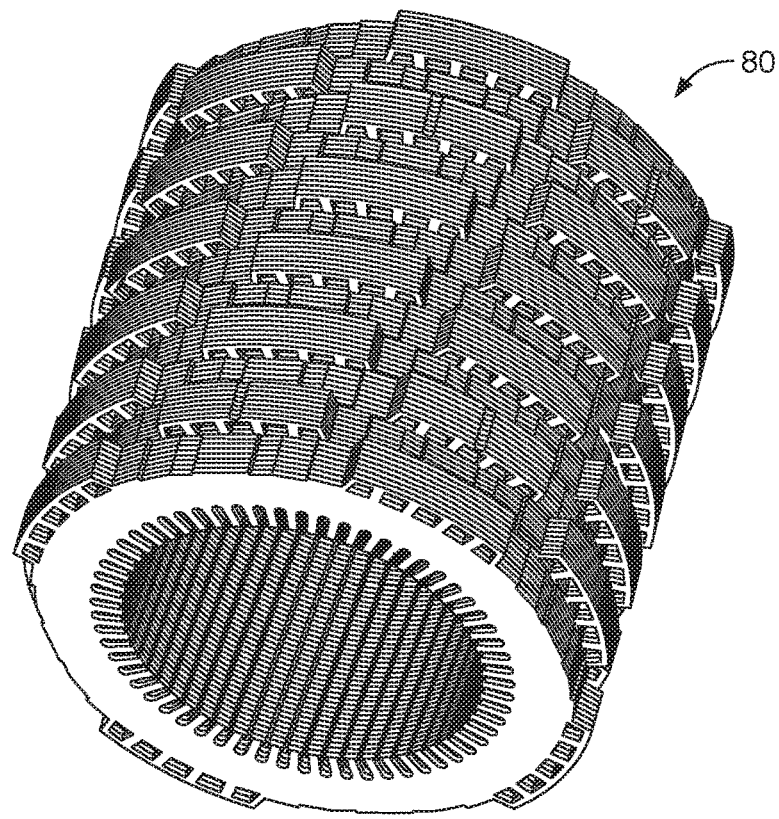

FIG. 26 shows how laminations of the type shown in FIG. 25 can be stacked to form a stator core. Referring to FIG. 26, in this embodiment, eight laminations are stacked together without indexing between the laminations to form a core pack. Although FIG. 26 shows eight laminations in a core pack for ease of reference, in practice the number of laminations in a core pack may be significantly more (each lamination being approximately 0.5 mm thick in one embodiment). A plurality of core packs are then stacked together to form the stator core 80. Each core pack is indexed (rotated about its axis) with respect to the preceding core pack by an amount which is slightly greater than 45°. Since the amount of indexing is only slightly greater than 45°, each group of fins in one core pack lies circumferentially between two adjacent groups of fins in an adjacent core pack. Furthermore, alternate core packs have groups of fins which are approximately aligned with each other. Thus, when considering a path running in a generally axial direction through the stator core, a group of fins is encountered every second core pack.

However, since the indexing is slightly greater than 45°, the groups of fins in alternate core packs are not exactly aligned with each other. Therefore, a group of fins in one core pack lies circumferentially between two adjacent groups of fins in an adjacent core pack, but closer circumferentially to one group than the other group. As a consequence, when viewed in an axial direction through the stator core, the groups of fins in alternate core packs are skewed, that is, a line running through their centre is offset (at a non-zero angle) to the axial direction.

In this embodiment, the amount by which each core pack is indexed with respect to the preceding core pack is approximately 45°+θ, where θ is an angle which is sufficient to ensure alignment of the stator slots. This ensures that the stator slots are continuous in an axial direction through the stator core while allowing all of the laminations to be the same shape. In the example shown there are 60 stator slots, and the pitch of the stator slots is approximately 6°. Thus, in this example, each core pack is indexed with respect to the preceding core pack by approximately 48°, which is a multiple of the stator slot pitch. However, it will be appreciated that the skewing of the groups of fins could also be in the opposite direction, and thus the amount of rotation between successive core packs could be approximately 42°. In another example, the stator may have 72 stator slots, in which case each core pack could be indexed with respect to the preceding core pack by approximately 51° or 39°, or some other multiple of the stator slot pitch. It will be appreciated that these values are given by way of example only, and other values (for example, rotations through a different number of stator slot pitches) are possible. In general, each core pack may be indexed with respect to the preceding core pack by an amount equivalent to half of the angular distance between two adjacent groups of fins (or an odd multiple thereof) plus or minus an amount sufficient to bring the stator slots at least approximately into alignment.

The exact amount of rotation between successive laminations and/or core packs may also be adjusted to achieve skewing of the stator slots through the stator core.

In this embodiment, the pitch of the fins in a group (i.e. the angular distance between adjacent fins in a group) is chosen such that at least some of the fins in a group of fins in one core pack are interposed between two cooling fins in a group of cooling fins in a core pack on the other side of the adjacent core pack. In this embodiment, the pitch of the fins is approximately 7.5°, although of course other values could be used instead. For example, the pitch of the fins could be chosen to be approximately equal to the pitch of the stator slots.

By rotating successive core packs through an angle of 45°+/−θ, it is possible to locate a cooling fin in one core pack circumferentially between two cooling fins in a group of cooling fins in the core pack on the other side of the adjacent core pack. Thus, when considering a path running in an axial direction through the stator core, a cooling fin 28 in one core pack coincides with an aperture 32 between adjacent fins in a group of fins in the core pack on the other side of the adjacent core pack. Thus, an air channel running in an axial direction through an aperture 32 in a group of fins in one core pack will encounter a fin in a group of fins in the core pack on the other side of the adjacent core pack (i.e. two core packs away). Thus, this arrangement allows the cooling fins to be staggered circumferentially, while using groups of fins with equal numbers of fins.

The stator core of FIG. 26 is therefore arranged such that air channels are provided in a generally axial direction through the stator core between the fins. However, the arrangement is such that, due to the staggered nature of the fins, there is no straight-line (line-of-sight) path for air flow through the entire stator core in an axial direction. The absence of a straight-line path means that more turbulence is introduced into the airflow than would otherwise be the case. This may help to increase the amount of cooling.

FIGS. 25 and 26 also show a slot 31 which is used to locate a "skew key" during assembly. The skew key is used to align the laminations as they are stacked together. The skew key also controls the stator slot skew angle for the stator core.

The embodiment shown in FIGS. 25 and 26 is designed to be used without landing bars. Thus, in this embodiment, the outer peripheries of the peripheral connecting members 30 are arranged to engage with the stator frame. By avoiding the use of landing bars, a straight-line air flow path through the stator core adjacent to a landing bar can be avoided. This may help to ensure that the airflow encounters the staggered cooling fins, thereby helping to improve the cooling.

In this embodiment, the fins themselves are designed to hold the stator within the stator frame. For example, the stator could be fitted to the stator frame after heating the stator frame, to give a small radial clearance during insertion. In this case, the resulting interference fit may generate radial loads through the cooling fins. Alternatively, the stator could be cold-pressed into the frame. In this case, during the assembly process, an axial load would be transmitted to the fins in addition to the radial load from the interference fit. It is therefore necessary to ensure that the fins have sufficient mechanical strength to cope with the loads that may be placed on them. This can be achieved through appropriate selection of the number of fins per group (six in this example) and number of laminations per core pack (eight or more in this example). Of course, different numbers of fins per group and laminations per core pack could be used to fit the circumstances. In general, the numbers of fins per group and laminations per core pack is a trade off between cooling performance and mechanical strength (fewer fins per group and fewer laminations per core pack give larger areas for air flow but less mechanical strength).

In this embodiment, the outer fins of a group are inclined (i.e. at a non-zero angle to the radial direction). This may help to provide additional strength against any rotating forces between the stator and the frame. However, it will be appreciated that the fins may have a different pitch and/or a different inclination.

It will be appreciated that other arrangements of stator fins are also possible. For example, different groups of fins within a lamination may have different numbers of fins. Furthermore, a lamination may have more or less than four groups of fins.

Figure 27:
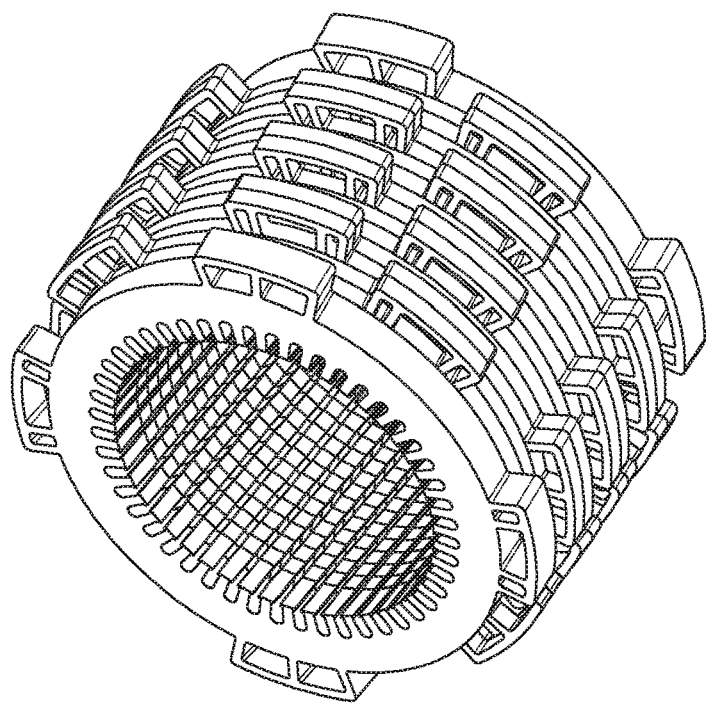
FIGS. 27 and 28 show a stator core in a further embodiment of the invention.
Figure 28:
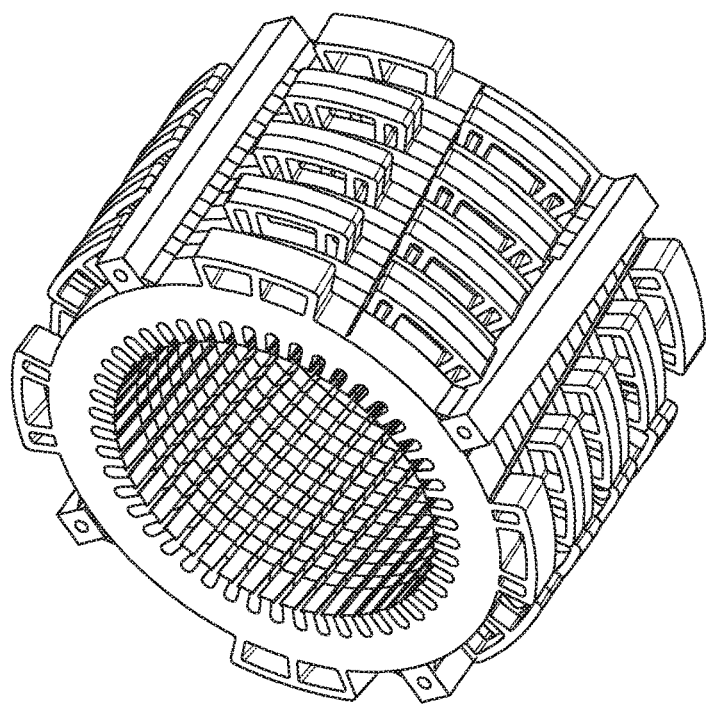

FIG. 27 shows a stator core in another embodiment of the invention. The cooling fins in a lamination are arranged in four groups, with the fins of a group connected by peripheral connecting members. In this embodiment, two of the groups have three fins, while two of the groups have four fins. The centre of each group of fins is spaced approximately 90° in a circumferential direction from the adjacent group, and the groups with the same number of fins are diametrically opposed (spaced by 180°). Apertures are defined between adjacent fins in a group. In this example, the groups with four fins have a larger aperture at the centre of the group than at either side. Landing bar slots are provided between groups of fins. FIG. 28 shows how landing bars are fitted in the landing bar slots.

Figure 29:
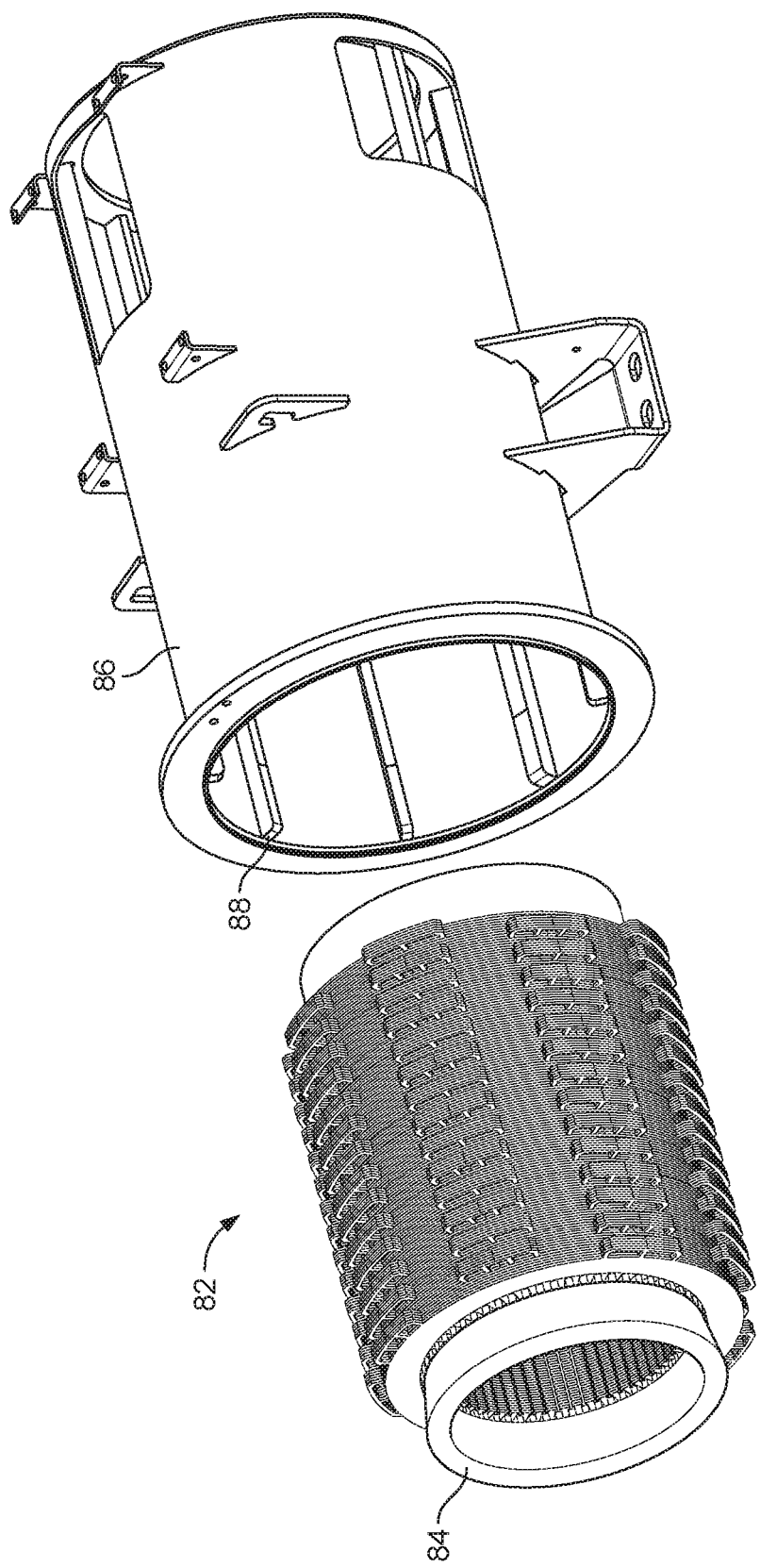
FIG. 29 illustrates how a stator core may be fitted to a stator frame.

FIG. 29 illustrates how a stator core may be fitted into a stator frame in an embodiment of the invention. Referring to FIG. 29, the stator comprises a stator core 82 and stator windings 84. In this example, the stator frame 86 includes landing bars 88. The stator is inserted axially into the stator frame, such that the landing bars 88 are located in landing bar slots between groups of fins on the stator core. In this embodiment the landing bars 88 are used to hold the stator core 82 within the stator frame 86.

In any of the above embodiments, a core pack may comprise a single lamination, or any other number of laminations. Each of the core packs which makes up a stator core may have the same number of laminations as the other core packs, or a different number.

It will be appreciated that embodiments of the invention have been described above by way of example only, and variations in detail are possible. For example, it may be possible for the laminations to include some cooling fins which are not connected by peripheral connecting members. Features of one embodiment may be used with any of the other embodiments. For example, a group of fins from one embodiment may be used in conjunction with a group of fins from any of the other embodiments. Furthermore, the invention is not limited to these embodiments, and other variations in detail will be apparent to the skilled person within the scope of the appended claims.

The invention claimed is:

1. A stator of a rotating electrical machine, the stator comprising a stack of stator laminations forming a stator core, wherein:
   a lamination comprises a plurality of cooling fins arranged in at least one group of at least two fins;
   the cooling fins in a group are connected by a peripheral connecting member;
   the laminations are arranged in packs of at least one lamination;
   a group of fins in one pack of laminations lies circumferentially between two adjacent groups of fins in an adjacent pack of laminations;
   a cooling fin in one pack of laminations is interposed between two cooling fins in a group of cooling fins in another pack of laminations;
   at least some of the packs of laminations comprise a plurality of groups of cooling fins;
   at least one group of fins has a different number of fins from another group of fins in the same lamination; and
   a group of fins with a lower number of fins in one pack of laminations has all of its fins interposed between fins in a group of fins with a higher number of fins in another pack of laminations.

2. The stator of claim 1, wherein the laminations comprise an annular body with an outer edge, and the cooling fins extend radially outwards from the outer edge.

3. The stator of claim 1, wherein gaps for cooling fluid are provided between adjacent cooling fins of a group.

4. The stator of claim 1, wherein the peripheral connecting members connect radially outwards ends of the fins in a group.

5. The stator of claim 1, wherein the cooling fins of one pack of laminations are staggered with respect to the cooling fins of another pack of laminations.

6. The stator of claim 1, wherein a group of fins with a higher number of fins in one pack of laminations has center fins which are interposed between the fins in a group of fins with a lower number of fins in another pack of laminations.

7. The stator of claim 1, wherein successive packs of laminations are indexed such that a group of fins in one pack of laminations lies circumferentially between two adjacent groups of fins in an adjacent pack of laminations, but closer circumferentially to one group than the other group.

8. The stator of claim 1, wherein the groups of cooling fins within a lamination are arranged such that a distance between two adjacent groups in a circumferential direction is greater than a width of a group in a circumferential direction.

9. The stator of claim 1, wherein the groups of cooling fins within a lamination are equally spaced in a circumferential direction.

10. The stator of claim 1, wherein the groups of cooling fins within a lamination are arranged such that they extend into corners of a notional rectangle encompassing the lamination.

11. The stator of claim 1, wherein the cooling fins of a lamination are arranged such that they fit within a notional rectangle having at least two sides with a length substantially equivalent to a diameter of an annular body of the lamination.

12. The stator of claim 1, wherein a lamination comprises two groups of fins with a different number of fins and the group with a larger number of fins has a beveled corner.

13. The stator of claim 1, wherein a circumferentially outer cooling fin in a group of fins is shorter in a radial direction than a middle fin in the same group of fins, and at least part of the peripheral connecting member is at an angle to the circumferential direction.

14. The stator of claim 1, wherein each lamination has substantially the same shape.

15. The stator of claim 1, wherein some of the packs of laminations are indexed with respect to other packs of laminations such that a cooling fin in one pack of laminations is interposed between two cooling fins in a group of cooling fins in another pack of laminations.

16. The stator of claim 1, the stator comprising landing bar slots, wherein the landing bar slots are defined between groups of fins of successive laminations in an axial direction.

17. A method of manufacturing a stator for a rotating electrical machine, the method comprising:
   forming a plurality of stator laminations, wherein a lamination comprises a plurality of cooling fins arranged in at least one group of at least two fins, and the cooling fins in a group are connected by a peripheral connecting member;
   arranging the laminations in packs of at least one lamination, wherein at least some of the packs of laminations comprise a plurality of groups of cooling fins, and at least one group of fins has a different number of fins from another group of fins in the same lamination;
   indexing the packs of laminations such that a group of fins in one pack of laminations lies circumferentially between two adjacent groups of fins in an adjacent pack of laminations; a cooling fin in one pack of laminations is interposed between two cooling fins in a group of cooling fins in another pack of laminations on the other side of the adjacent; and a group of fins with a lower number of fins in one pack of laminations has all of its fins interposed between fins in a group of fins with a higher number of fins in another pack of laminations; and
   stacking the packs of laminations to form a stator core.

18. A stator of a rotating electrical machine, the stator comprising a stack of stator laminations forming a stator core, wherein:
   a lamination of the stack of stator laminations comprises a plurality of cooling fins arranged in at least one group of at least two fins;
   the cooling fins in a group are connected by a peripheral connecting member;
   the laminations are arranged in packs of at least one lamination;
   a group of fins in one pack of laminations lies circumferentially between two adjacent groups of fins in an adjacent pack of laminations;
   a cooling fin in one pack of laminations is interposed between two cooling fins in a group of cooling fins in another pack of laminations;
   at least some of the packs of laminations comprise a plurality of groups of cooling fins;
   at least one group of fins has a different number of fins from another group of fins in the same lamination; and
   a group of fins with a higher number of fins in one pack of laminations has least one center fin which is interposed between fins in a group of fins with a lower number of fins in another pack of laminations.

* * * * *